Dec. 29, 1936.  P. O. FARNHAM  2,065,890

SELECTIVE DETECTION

Filed Sept. 14, 1932  6 Sheets-Sheet 1

Inventor:
Paul O. Farnham,
By Byrnes, Townsend & Potter,
Attorneys.

Dec. 29, 1936. P. O. FARNHAM 2,065,890
SELECTIVE DETECTION
Filed Sept. 14, 1932 6 Sheets-Sheet 3

Inventor:
Paul O. Farnham,
By Byrnes, Townsend & Potter,
Attorneys.

Dec. 29, 1936.  P. O. FARNHAM  2,065,890
SELECTIVE DETECTION
Filed Sept. 14, 1932   6 Sheets-Sheet 4
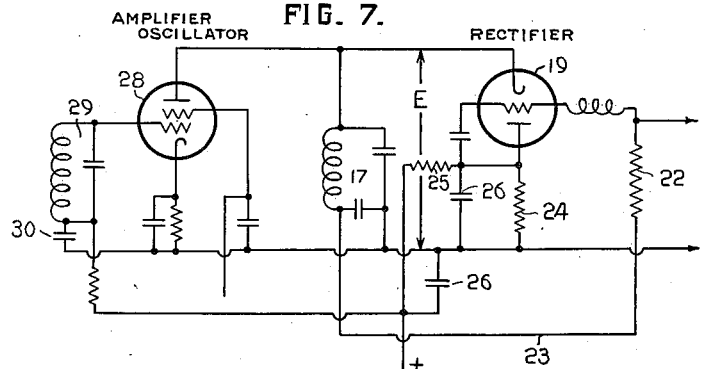
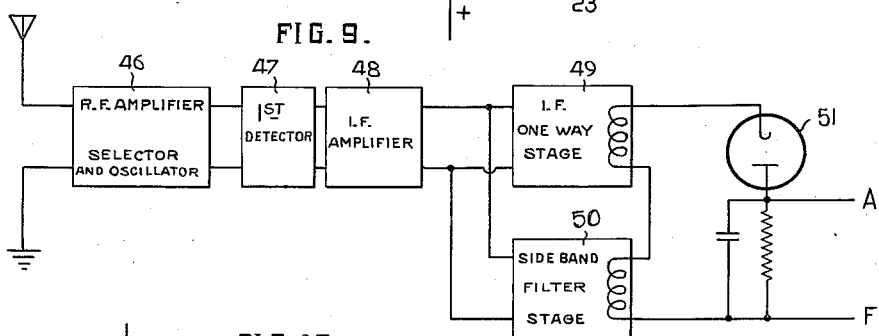
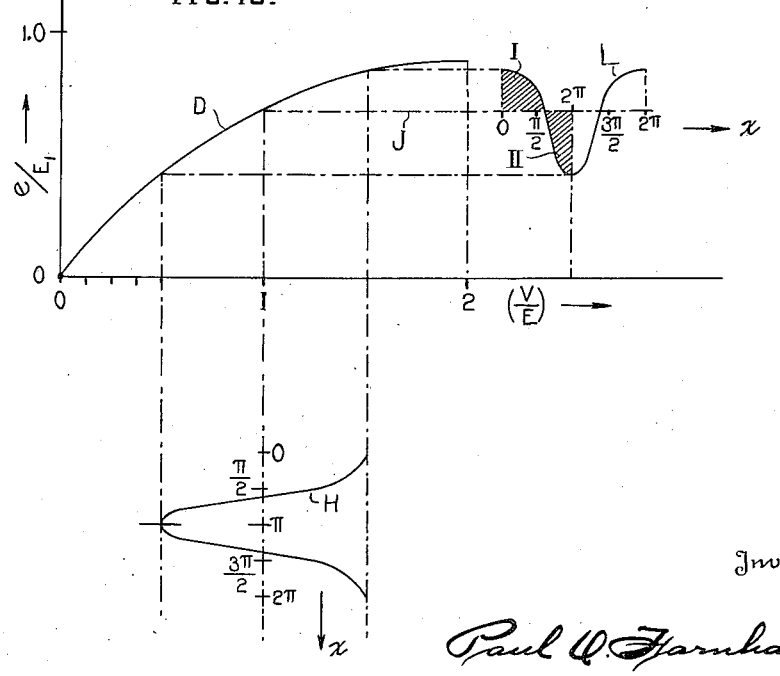
Inventor:
Paul O. Farnham,
By Byrnes Townsend & Potter,
Attorneys.

Dec. 29, 1936.　　　　　P. O. FARNHAM　　　　　2,065,890
SELECTIVE DETECTION
Filed Sept. 14, 1932　　　　　6 Sheets-Sheet 6

Inventor:
Paul O. Farnham,
By Byrnes Townsend & Potter
Attorneys.

Patented Dec. 29, 1936

2,065,890

UNITED STATES PATENT OFFICE 2,065,890

SELECTIVE DETECTION

Paul O. Farnham, Boonton, N. J., assignor, by mesne assignments, to Radio Corporation of America, New York, N. Y., a corporation of Delaware Application September 14, 1932, Serial No. 633,170

20 Claims. (Cl. 250—20)

This invention relates to communication systems adapted for the selective reception of radio signals and particularly to methods of and apparatus for preventing interference from signals received at a carrier frequency differing from that to which the system is adjusted to respond.

To secure a satisfactory degree of freedom from interference in the reception of modulated radio signals, it has been the practice to include one or more tuned circuits in the radio amplifying system. These circuits were usually adjustable in a single-control operation for the purpose of selecting a band of frequencies to which the amplifier was generally responsive. If reception conditions demanded a higher degree of selectivity, more tuned circuits were added to the system, or the power factor of the existing circuits was reduced, or the heterodyne principle of modifying the received frequency band to one centered about a lower or "intermediate frequency" was employed. It is well known that any increase of selectivity obtained by these methods is accompanied by a decrease in the transmission of the higher modulation frequencies and thus tends to destroy the fidelity of reproduction.

An object of the invention is to provide, in a system adapted to receive radio signals, methods of and circuit arrangements for obtaining selectivity in addition to that resulting from the selectivity characteristics of any tuned circuits included in the system.

An object is to provide a system for the reception of modulated radio signals, which system is characterized by a high selectivity which involves no loss in a reproduction of the higher modulation frequencies. Further objects are to provide methods of and circuit arrangements for obtaining a substantial increase in the selectivity of various types of radio receivers, which selectivity increase is independent of the difference in frequency between the desired carrier and the interfering carrier. Further objects are to provide methods of and circuit arrangements for obtaining selectivity in the rectifier of a radio receiving system; and more particularly, to provide methods of and circuit arrangements for the rectification of carrier voltages, which methods and circuits are characterized by impressing upon the rectifier an unmodulated carrier voltage of the frequency of the desired signal. Further specific objects of the invention are to provide rectifier systems including circuit arrangements for impressing upon the rectifier an unmodulated carrier voltage of the desired signal frequency, which voltage may be generated locally or, in other embodiments of the invention, may be derived from the received radio signal.

These and other objects and advantages of the invention will be apparent from the following specification when taken with the accompanying drawings, in which.

Figure 11:
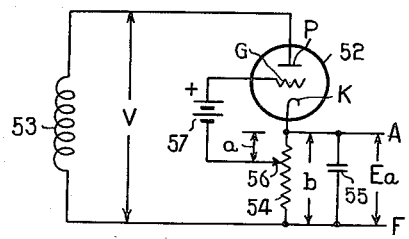
Figure 12:
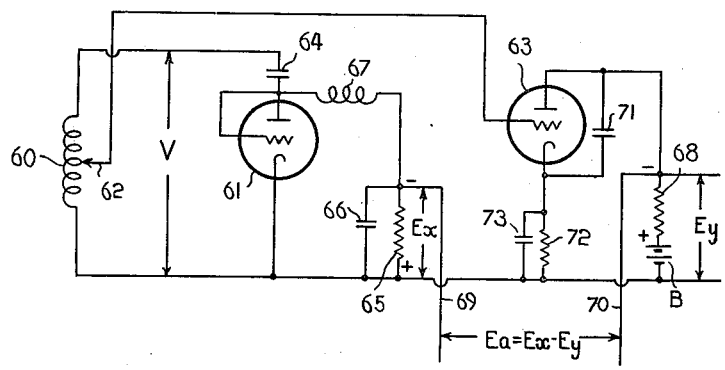
Figure 13:
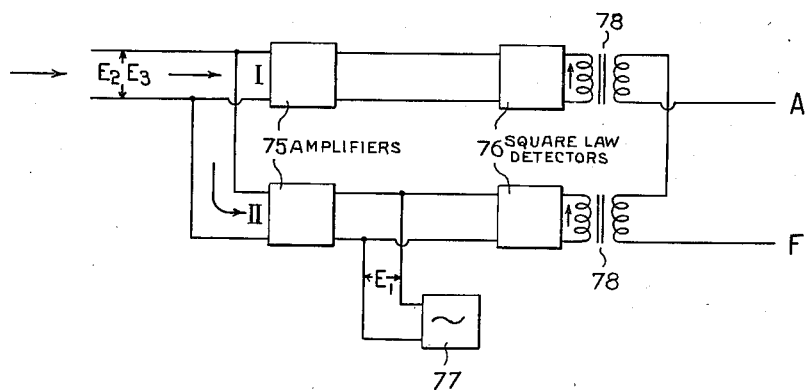

Figs. 5 to 8, inclusive, are circuit diagrams of embodiments of the invention in which the unmodulated carrier voltage of the desired frequency is generated locally;

Fig. 9 is a schematic diagram of a receiver system in which the extra carrier voltage necessary for selective rectification is derived from the desired incoming carrier itself;

Fig. 10 is a curve sheet illustrating a detector characteristic which provides a discrimination factor greater than that obtained from a linear detector;

Figs. 11 and 12 are circuit diagrams of detector arrangements which have characteristics such as shown in Fig. 10, and Fig. 13 is a schematic diagram of another detector arrangement involving two vacuum tubes and capable of providing a discrimination factor greater than that obtained from a linear detector.

I have discovered that when two radio oscillations of different frequency are impressed upon a detector of suitable characteristics, the presence of the first oscillation may make the detector less responsive to the second oscillation than if the first were absent. In particular, if the second oscillation be a modulated voltage having side bands which normally appear in the output of the detector as components of audio frequency, the effectiveness of the detector to demodulate such a voltage may be substantially reduced by the coexistent action of the first voltage upon the detector. On the other hand, if the modulated voltage has exactly the same carrier frequency as that of the first voltage, and therefore bears a constant radio-frequency phase relation to the first voltage, the second voltage may be demodulated by the detector at least as effectively as if the first voltage were absent.

In accordance with the invention, the desired modulated wave is received by known means, which may include a radio frequency amplifier, and the resulting modulated voltage is impressed upon a detector and there combined with a substantially unmodulated voltage of suitable amplitude and of the same frequency as the carrier of the desired signal.

In a receiving system arranged in accordance with the steps outlined above, a detector of appropriate and known characteristics is relatively unresponsive to an interfering signal, in virtue solely of the presence of the local oscillation, and the detector discriminates strongly against the side bands of any interfering modulated wave whose carrier differs in frequency from the carrier of the desired signal and hence from the local oscillation.

For a better understanding of the method of operation of the invention, an analysis will be given of the effects upon a detector of the respective combinations of a locally supplied oscillation with a desired signalling wave of the same carrier frequency and with an undesired signalling wave of a different carrier frequency. For brevity, the locally supplied oscillation will be designated as the "rejector oscillation" since its function is to hinder demodulation of an undesired signal.

Figure 1:
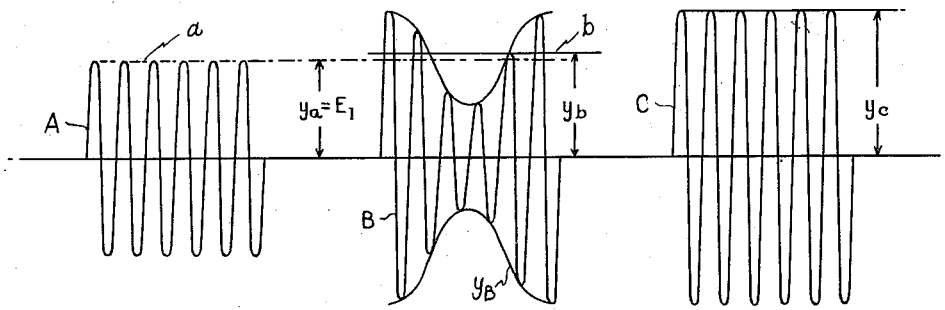
Fig. 1 illustrates the wave shape of a continuous wave voltage, and the wave shapes obtained by combining that voltage with one of smaller amplitude and different frequency, and with one of smaller amplitude and the same frequency.

In Fig. 1, the curve or wave shape A illustrates an unmodulated carrier wave voltage, $e_1 = E_1 \sin \omega_1 t$, plotted on a time axis and, in the following discussion, the voltage $e_1$ will be considered the rejector oscillation. The curve B illustrates the result of combining the rejector voltage with a second voltage of different frequency, $e_2 = E_2 \sin \omega_2 t$, representing an undesired signal, and which, for simplicity of analysis, will be considered as unmodulated. As is well known, two such oscillations beat together, producing a combination oscillation whose amplitude varies with time and, in Fig. 1, the line $y_B$ is the envelope of this pulsating amplitude.

The trigonometric expression of this envelope, as a function of time, can be shown to be $$y_B = E_1 \sqrt{1 + \beta_2^2 + \beta_2 \cos x} \quad (1)$$

where $$\beta_2 = \frac{E_2}{E_1}$$

and $x = (\omega_2 - \omega_1)t$. The envelope is not a pure sine wave but its fundamental frequency is equal to the frequency difference, $(\omega_2 - \omega_1)$, usually called the "beat frequency".

Since the response of a detector to the combination voltage is to be studied, the average value $y_b$ of the pulse or beat oscillation which forms the envelope is of special interest.

The envelope of the rejector voltage $e_1$ is a straight line $a$ parallel to and spaced from the time axis by the average voltage value $y_a = E_1$ and, if the envelope $y_B$ were a pure sine curve, its average value would be equal to $y_a$. Actually the average value of the envelope is given by the integral:

$$y_b = \frac{E_1}{\pi} \int_0^\pi y_B dx \quad (2)$$

which is slightly greater than $E_1$, and is indicated by the horizontal line $b$.

The curve C illustrates the wave form resulting from the combination of the rejector voltage with a desired carrier voltage having exactly the same frequency, as $e_3 = E_3 \sin \omega_1 t$, which will first be considered as unmodulated. If these oscillations are added, in phase, the resulting voltage $(E_1 + E_3) \sin \omega_1 t$ has an envelope which is constant, and its average value $y_c$ is also constant and equal to the sum of $E_1$ and $E_3$:

$$y_c = E_1 + E_3 = E_1(1 + \beta_3) \quad (3)$$

where $$\beta_3 = \frac{E_3}{E_1}$$

Since the rejector oscillation combines with the undesired wave to produce an envelope whose mean value is but slightly greater than that of the envelope of the rejector oscillation, while it combines with the desired wave to produce an envelope having a substantially increased mean value, it follows that a substantial discrimination against undesired signals may be had if the combination voltages are impressed upon a detector whose useful output depends upon the mean values of the envelope.

Figure 2:
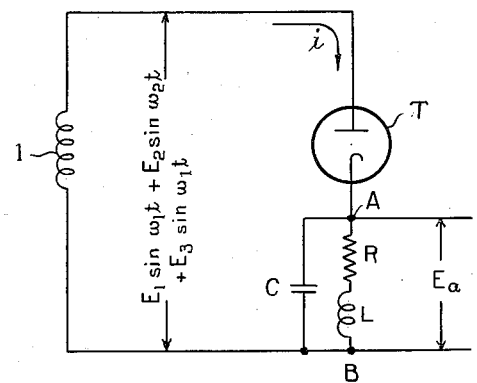
Fig. 2 is a circuit diagram of a linear detector upon which combined voltages, such as shown in Fig. 1, are impressed.
Figure 2A:
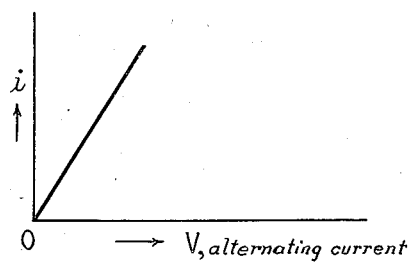
Fig. 2a is a curve illustrating the current-voltage characteristic of a linear detector.
Figure 2B:
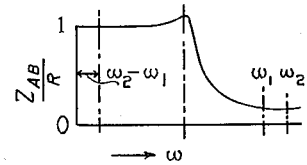
Fig. 2b is a curve showing the variation with frequency of the output impedance of the detector circuit of Fig. 2.

A linear detector, such as the diode detector system shown in Fig. 2, has the characteristic of passing an average output current (direct current in the case of unmodulated waves) which is proportional to the mean value of the envelope of the peaks of the impressed alternating current voltage. As shown, the detector consists of a diode T having a serially connected input impedance I and an output impedance, between points A and B, formed by the parallel mesh comprising capacity C, resistance R, and inductance L. The desired linear relationship between the average output current $i$ and impressed alternating current voltage V is shown in Fig. 2a, and this detection characteristic may be obtained by so designing the output impedance mesh that its parallel impedance $Z_{AB}$ is equal to the ohmic resistance R, for direct current, is also equal to or greater than R for the difference frequency $(\omega_2 - \omega_1)$, but is negligibly small for both radio frequencies $\omega_1$ and $\omega_2$. It is apparent from an inspection of Fig. 2 that this is possible, and the curve of Fig. 2b shows graphically a typical impedance characteristic for the output mesh, the resistance R being set at a suitably high value to develop a substantial output voltage $E_a$.

The input voltage impressed upon the detector includes the rejector oscillation, $E_1 \sin \omega_1 t$; the desired signal voltage, $E_3 \sin \omega_1 t$; and the interfering voltage, $E_2 \sin \omega_2 t$. The rectified current flows through the series circuit and develops an output voltage which is to be examined for the presence of rectification products due to the desired and the undesired voltage. The significant output voltage, $E_a$, depends upon the average output current $i$ which, when the above circuit conditions are fulfilled, will be proportional to the magnitudes $y_a$ and $y_c$ of the rejector voltage and of the rejector voltage combined with the desired voltage, and proportional to the mean value $y_b$ of the envelope of the pulsating oscillation which comprises the undesired voltage plus the rejector voltage.

$$i = A + Ky_a$$
$$i = B + Ky_b \qquad (4)$$
$$i = C + Ky_c$$

where K is a constant depending upon the diode and circuit, and A, B, C are constants.

The total average current $i$ may be considered as made up of additive components due independently to the rejector voltage, and to the combinations thereof with the undesired and the desired voltages. The values of the change in average current, $\Delta i_3$ due to the desired oscillation; and the change in average output current $\Delta i_2$ due to the presence of the undesired signal, are given by the equations:

$$\Delta i_3 = K(y_c - y_a)$$
$$\Delta i_2 = K(y_b - y_a)$$

Since these magnitudes are indices of the response of the detector, in the presence of the rejector oscillation, to the desired and the undesired signal, the ratio of these values may be defined as a discrimination factor against the direct current rectified output due to the undesired continuous wave voltage:

$$F' = \frac{\Delta i_3}{\Delta i_2} = \frac{\frac{y_c}{y_a} - 1}{\frac{y_b}{y_a} - 1} \qquad (5)$$

which equation may be reduced, by Equations (2) and (3), to $$F' = \frac{\beta_3}{\frac{1}{\pi}\int_0^\pi y_B dx - 1} = \frac{\beta_3}{f(\beta_2)} \qquad (6)$$

Figure 3:
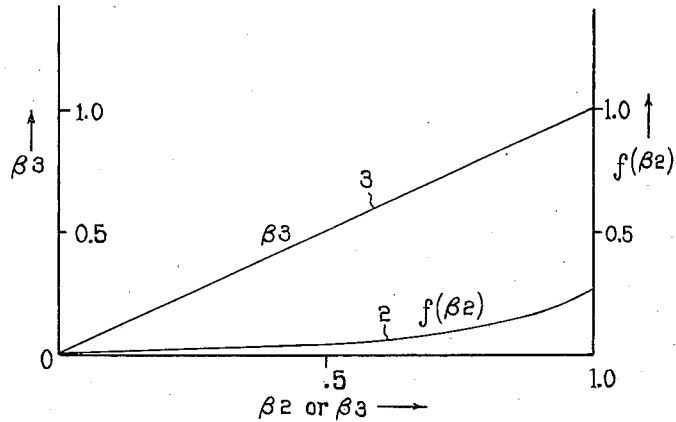
Fig. 3 is a curve sheet showing the relationship between values representing the direct current output of the Fig. 2 circuit and the ratios of the local oscillation voltage of desired frequency and the voltages of the desired and undesired carrier frequencies.

The numerator, $\beta_3$, is simply the ratio of the desired carrier to the rejector voltage and the definite integral in the denominator increases relatively slowly with increases in the undesired voltage, as is apparent from the above discussion of curve B, Fig. 1. In Fig. 3, the numerator and denominator of the discrimination factor $F'$ are plotted, respectively, against the ratio $\beta_3$ of the desired to the rejector voltage and the ratio $\beta_2$ of the undesired to the rejector voltage. The curve 3 of the numerator $\beta_3$ is, obviously, a straight line, and the curve 2 of the denominator $f(\beta_2)$ follows, approximately the equation.

$$f(\beta_2) = \left(\frac{4}{\pi} - 1\right)\beta_2{}^2 = 0.272\beta_2{}^2 \qquad (7)$$

An inspection of these curves will show that, at least for unmodulated waves, a substantial discrimination against undesired signals may be obtained in a linear detector by the addition of a local unmodulated oscillation of the frequency of the desired signal.

If there were no discrimination, the curves 2 and 3 would coincide at every point for all values of $\beta_2$ and $\beta_3$. It is apparent, however, that for equal values of the desired signal $E_3$ and the undesired signal $E_2$, so that $\beta_3$ is equal to $\beta_2$, the ratio of the desired to the undesired output is always greater than about 3.5 for values of $\beta_2$, $\beta_3$ less than unity, and that this ratio increases rapidly as $\beta_2$, $\beta_3$ decrease, i. e., as the rejector voltage is increased.

In the above discussion, the desired signal voltage $e_3$ and the undesired voltage $e_2$ were considered as unmodulated or continuous wave voltages. If these signal voltages are modulated, it is apparent that the constant mean value $y_b$ of the envelope of the combination of the undesired and the rejector voltage changes to a fluctuating mean value which varies in accordance with the modulation of the undesired signal. Similarly, the constant mean value $y_c$ of the combination of the desired signal and the rejector voltages becomes a fluctuating value which varies with the modulation of the desired wave. The rejector oscillation remains unmodulated in the case of modulated signals. The new fluctuating mean value of the undesired combination is again smaller than the corresponding value for the desired combination. The significant detector output currents are now of audio frequency and, in a detector of the type shown in Fig. 2, are proportional to the slopes of the curves of Fig. 3. Consequently, the result of adding an unmodulated voltage of the desired signal frequency to the detector input is to effect a substantial discrimination, in the audio frequency detector output, against the modulation of an undesired carrier frequency.

In the case of modulated waves, the discrimination factor $F'$ does not apply, as that factor depends upon the ordinates of the curves 2, 3 of Fig. 3, and not, as with modulated waves, upon the slopes of those curves. Obviously, also, the new discrimination factor depends upon the respective percentages of modulation $m_3$, $m_2$ of the desired signal $E_3$ and the undesired signal $E_2$.

The discrimination factor F for modulated waves may be defined as the ratio of the fundamental audio-frequency output due to single frequency modulation of the desired voltage to the fundamental audio-frequency output due to single frequency modulation of the undesired voltage. Reverting to the curves of Fig. 3, the slope of the $f(\beta_2)$ curve is, from Equation (7), approximately $$f'(\beta_2) = 0.544\beta_2$$

and the slope of the $\beta_3$ curve is unity. Consequently, the discrimination factor F against fundamental modulation frequency output is, for the linear detector, approximately:

$$F = \frac{m_3}{.544\beta_2 m_2} \qquad (8)$$

By inspection, it will be seen that this discrimination factor increases rapidly, for fixed values of undesired and desired modulated voltages, as the rejector voltage is increased.

By a similar process of analysis, expressions may be derived for the action in the case of a square-law detector, i. e., one having an average output current proportional to the square of the impressed alternating current voltage. In this case, for direct current output resulting from the rectification of unmodulated waves, the discrimination factor is:

$$F'_s = \frac{\beta_3}{\beta_2{}^2}(\beta_3 + 2) \qquad (9)$$

and for fundamental modulation-frequency outputs resulting from the rejection of modulated waves, the discrimination factor is:

$$F_s = \frac{\beta_3 + 1}{\beta_2} \times \frac{m_3}{m_2} \qquad (10)$$

Figure 4:
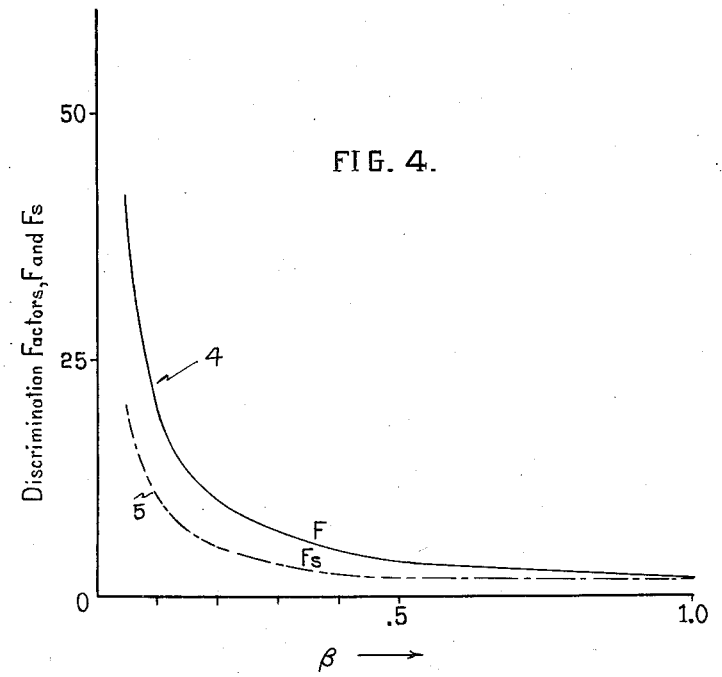
Fig. 4 is a graph of the discrimination factor against modulation frequency output for linear and square law detectors, for the case in which the undesired carrier level and the desired carrier level are equal at the detector and are each modulated to the same degree.

In Fig. 4, the curves 4, 5 show the relation between the discrimination factors F and $F_s$, respectively, and different ratios of the signal and rejector voltages, the curves being plotted for the special case in which the desired and undesired voltages are equal, and the percentages of modulation are equal. It is to be noted that substantial discrimination (i. e. F>1) is obtained for both types of detectors over a wide range of amplitudes of rejector oscillation, and that for a rejector oscillation over ten times as great as the detector carrier input ($\beta_3=\beta_2=\beta<0.1$), the discrimination reaches large values. The discrimination in the case of the linear detector for small values of $\beta$ is approximately twice as great as in the case of the square-law detector.

With both types of detectors, the rectified output will include an alternating current component having a frequency equal to the beat frequency ($\omega_2-\omega_1$) for all frequencies and percentages of modulation of the desired and undesired waves. This beat note output will produce no undesirable result if the desired and interfering carrier waves are separated by a supersonic frequency as is the case when the respective carriers are separated by as much as two channels of 10 kilocycles each in the allocation schedule of broadcast frequencies. There will also be components in the detector output having frequencies represented by the sum and difference of the "beat" frequency ($\omega_2-\omega_1$) and the modulation frequency associated with the undesired wave. In the case of an interfering carrier separated by only one 10 kilocycle channel, the beat note product may be filtered out of the rectified output.

Reverting to the discussion of the combination curve C of Fig. 1, particular attention is directed to the fact that the rejector oscillation $e_1$ and the desired signal oscillation were assumed to be exactly in phase. This phase relation may also be one of phase opposition since either case represents a condition for maximum detection of the desired carrier wave. This feature is important in that it requires that the rejector oscillation have its phase as well as its frequency accurately controlled by a received carrier. In any practical rectifier system employing the novel method, it is therefore essential that means be provided for bringing the rejector oscillation into phase with the received wave or, preferably, for automatically maintaining these oscillations in phase.

Figure 5:
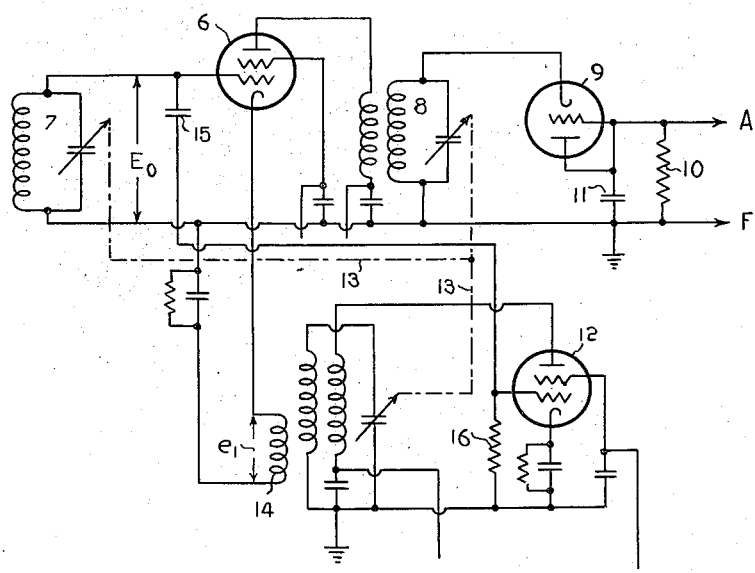

A simple circuit arrangement in which the local oscillator tends to lock in step with the desired carrier is illustrated in Fig. 5. In the fragmentary receiver circuit, there shown, the amplifier tube 6 has a tuned input circuit 7 which may be coupled to a collector system or to other amplifier stages, and the amplifier is coupled to a similar tuned circuit 8 which constitutes the input impedance of a linear rectifier 9, which may be a triode with connected grid and plate elements. The output impedance of the rectifier is a parallel mesh comprising a resistance 10 and capacity 11. Except that the capacity 11 is of such magnitude that the impedance of the parallel mesh is not substantially less than the resistance of the resistance branch 10 for the maximum difference in carrier frequency over which selective rectification is desired, the general structure and arrangement of the amplifier and rectifier circuits may conform to the known practice.

In accordance with the invention, however, a local oscillation is introduced into the amplifier input circuit to combine with the desired signal $e_1$ and the interfering signal $e_2$ that are developed across the input circuit 6. The oscillator tube 12 has a tuned network of any convenient design and, as is usual in receiver design, the tuning elements of the several tuned circuits are preferably mechanically connected, as indicated by the broken line 13, for simultaneous adjustment. A coil 14 connected between the cathode of the amplifier tube 6 and ground is coupled to the oscillator network to introduce the rejector oscillation voltage $e_1$ into the amplifier input circuit. The tendency of the oscillator to lock in step with the carrier frequency oscillations impressed on the amplifier tube may be augmented by impressing between the control grid and cathode of the oscillator tube 12, a voltage derived from the input circuit of the amplifier tube. As shown, this may be accomplished by connecting the control grids of the amplifier tube 6 and oscillator tube 12 through a capacity 15, the control grid and grounded cathode of the oscillator tube being connected by a high resistance 16.

The voltage $E_0$ across the input circuit of the amplifier tube includes the desired signal $e_3$ and may include an undesired signal $e_2$. By adding the unmodulated voltage $e_1$, generated by the local oscillator and in phase with voltage $e_3$, a substantial discrimination is obtained at the detector 9, 10, 11, against audio components due to the modulation of the undesired voltage $e_2$.

Figure 6:
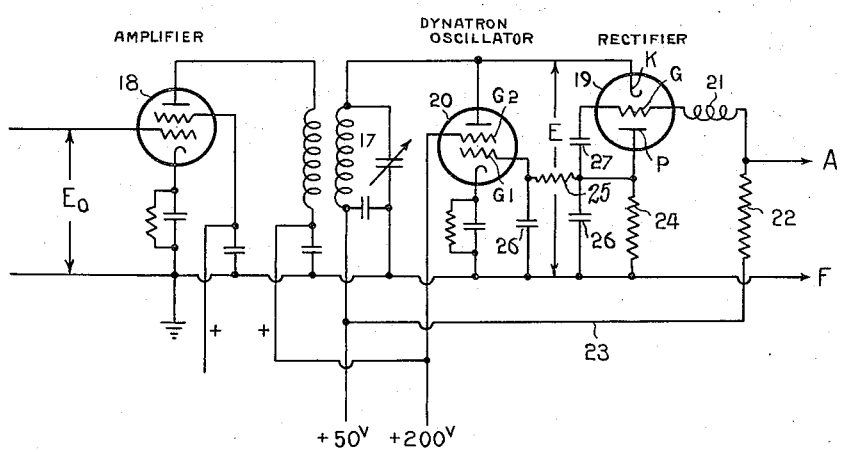

As shown in Fig. 6, the frequency determining mesh of a local dynatron oscillator may be the tuned output circuit 17 of a radio frequency amplifier tube 18 which precedes the rectifier 19. To secure proper amplification in the stage which includes the tube 18, the amplitude of the local oscillator voltage in the tuned output circuit 17 must be at a lower level than that which will overload the plate circuit of tube 18. This condition may be obtained over a wide range of oscillator tuning by use of the method described and claimed in my copending application, "Dynatron oscillators", Ser. No. 617,446, filed June 15, 1932, Patent No. 2,011,290, August 15, 1935.

In accordance with that invention, the direct current bias on the control grid $G_1$ of the oscillator tube 20 is not fixed but is varied automatically by a rectifier comprising the cathode K and plate P of the tube 19. This two-element rectifier acts primarily as an oscillator control element and takes only a minor part in the demodulation of the incoming voltage E, that function being mainly performed by the two-element rectifier formed by the grid element G and cathode K of tube 19. The double rectifier tube 19 has its cathode K connected to the plate of the oscillator tube 20 and to the high potential terminal of the amplifier output circuit 17. The direct current potential of the cathode K is more positive than that of ground by a potential which, as noted on the drawings, may be 50 volts, but this voltage does not place a bias on the demodulator elements since the audio frequency output circuit, consisting of a radio frequency choke 21 and an output resistance 22, is returned to the 50 volt line by a lead 23.

The output resistance 24 of the oscillator control rectifier is connected between the plate P and ground, and therefore all output of this rectifier is suppressed until the peaks of the input voltage E exceed 50 volts. The plate P of the rectifier 19 is connected to the control grid $G_1$ of the oscillator tube through an audio frequency filter comprising a resistance 25 and condensers 26, and the plate is connected to the grid G through an audio frequency by-pass condenser 27. An increase in the voltage E above the bias of 50 volts will produce rectification in the control rectifier circuit, thus applying a negative bias to the control grid of the oscillator tube, automatically keeping the oscillator output within close limits and, with appropriate circuit constants, within the range of substantially linear operation of the oscillator.

A modification of the above circuit is shown in Fig. 7, in which the tube 28 acts both as the carrier wave amplifier and as a dynatron oscillator. In this arrangement, the tuned input circuit 29 of the combined amplifier-oscillator tube 28 is grounded, for radio frequencies, by a condenser 30, and the automatic bias voltage for controlling the oscillator action is obtained by returning the input circuit to ground, for direct current, through the alternating current filter 25, 26 and the output resistance 24 of the control rectifier. The double rectifier tube 19 and its associated circuit elements are, or may be, substantially identical with the rectifier stage shown in Fig. 6.

Figure 8:
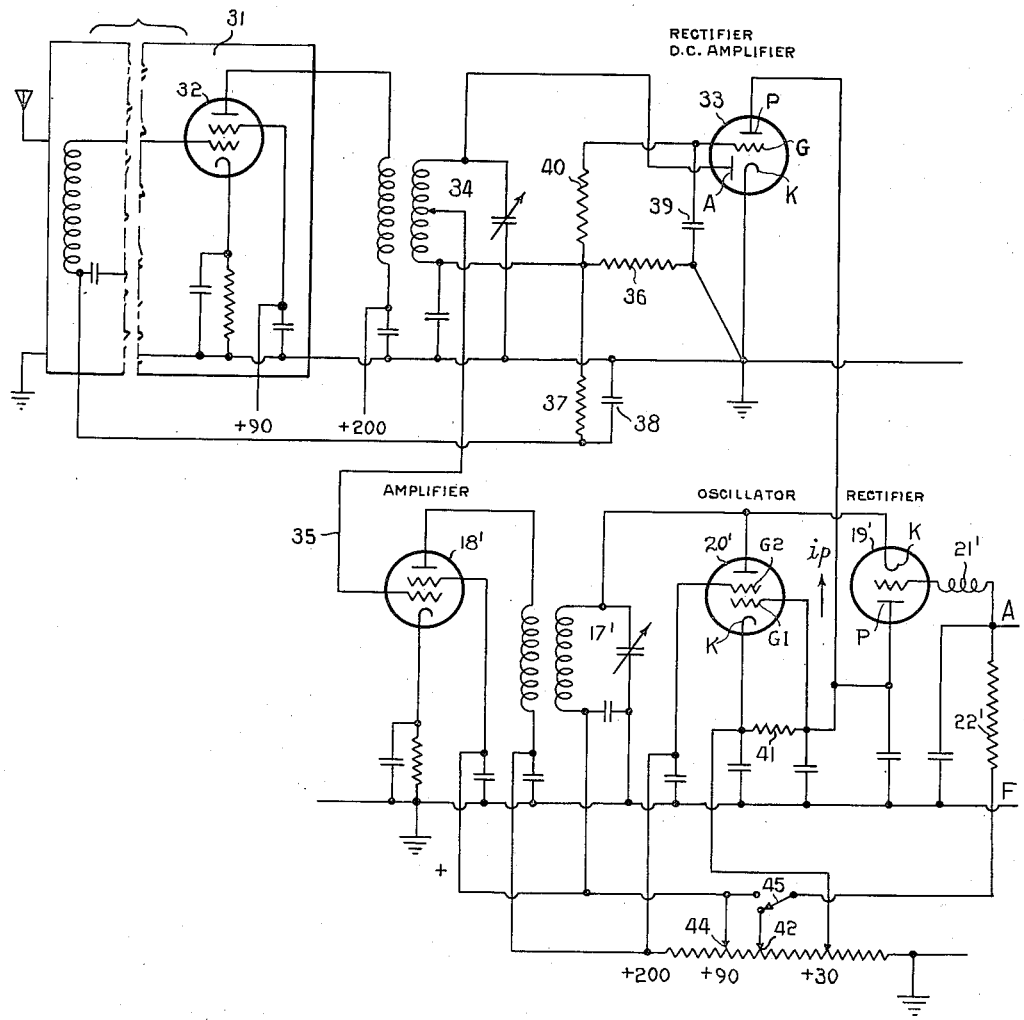

Automatic gain control systems may be incorporated in receivers which employ the selective rectification method of this invention, and one form of such a receiver is shown in Fig. 8. The general arrangement of the circuits of the last amplifier tube 18', the dynatron oscillator 20', and the double rectifier tube 19' may be similar to that illustrated in Fig. 6. These stages are preceded by a radio frequency amplifier 31, including one or more tubes 32, and a rectifier tube 33 which forms part of a system for automatically regulating the gain of the amplifier 31. The tuned output circuit 34 of the amplifier 31 includes a tapped inductance, and the input circuit, containing both the desired and undesired frequencies, is impressed on tube 18' by a lead 35 which connects the control grid of the tube to this tap.

The full carrier potential developed across the tuned circuit 34 is impressed upon a two-element rectifier comprising the anode A and cathode K of the tube 33, and the direct current potential developed across the output resistance 36 of this rectifier is applied, through a filter comprising resistance 37 and capacity 38, to the amplifier 31 as an automatic gain control voltage. In order to suppress undesirable beat note output when the receiver is detuned sufficiently to cause the local oscillator to pull out of synchronism with the desired carrier, this direct current voltage may also be employed to suppress the oscillator output for all values of carrier level at the rectifier 33 below a predetermined level.

As illustrated, this action is obtained by impressing the direct current voltage developed across resistor 36 upon a direct current amplifier which is formed, in the same vacuum tube 33, by control grid G, plate P and the common cathode K. The control grid G is connected to the cathode through a by-pass condenser 39, and through a resistance 40 to that terminal of the output resistance 36 which is more negative than the cathode during operation of the rectifier A, K. The output circuit of the direct current amplifier includes the resistance 41 which is connected between the control grid $G_1$ and the cathode K of the oscillator tube 20'. As the carrier input to the rectifier-amplifier tube 33 falls off, the bias on control grid G becomes less negative and the plate current increases and, the current flow being in the direction indicated by the arrow $i_p$, the direct current potential of the control grid $G_1$ goes negative with respect to the oscillator cathode, thus suppressing all oscillations when the carrier level at tube 33 falls below a predetermined level.

As in the Fig. 6 circuit, a control of the oscillator amplitude is provided by impressing on the control grid $G_1$, the direct current output developed by the rectifier elements P, K of the double rectifier tube 19'. A further automatic control for suppressing all audio output for carrier levels at rectifier 19' below a predetermined value, is obtained by returning the audio frequency output resistance 22' to a point 42 on the direct current source, illustrated as the voltage divider 43 of a power supply unit, that is more negative than the point 44 to which the cathode K of tube 19' is connected. A switch 45 may be provided for removing the negative bias on grid $G_1$ when this automatic control is not desired.

In the circuits as so far described, a local oscillator has been provided to supply the locally-introduced rejector voltage. The rejector voltage may, however, be obtained from the desired carrier, by the method which is shown schematically in Fig. 9.

As indicated by the legends, this form of receiver is of the superheterodyne type and includes a radio frequency amplifier, selector and heterodyne oscillator 46, a first detector 47, and intermediate frequency amplifier stage or stages 48 which work into, in parallel, a one-way intermediate frequency amplifier stage 49 and a side band filter stage 50 which is so sharply tuned as to suppress substantially the side bands of the desired signal wave. The requisite sharpness may be secured with the known piezo-electric crystal arrangements or, if the intermediate frequency be sufficiently low, by other known selective circuit means. Since the output of the filter stage may be restricted to include substantially no frequencies other than the intermediate frequency resulting from the desired incoming carrier frequency, it may be employed as the rejector voltage and applied to the detector 51 in series with the output of the stage 49 which contains both desired and the undesired frequencies. The output from the filter stage is always of the right frequency since it is the frequency of the wave to which the receiver as a whole is tuned to respond.

While simple detectors with characteristics of either the linear or square-law type give a marked discrimination factor, still further increases in the discrimination against undesired signals may be secured by combinations of the known detectors or by detector circuits designed to exhibit novel characteristics.

The foregoing discussion has shown that both of the most commonly used types of detectors (i. e., linear and square-law) may be used to obtain selective rectification, and that a linear detector gives a greater discrimination than a square-law detector.

In the present-day receivers, the detector usually has such a characteristic that the output varies no more rapidly than the square and no less rapidly than the first power of the impressed voltage. The invention is therefore useful in connection with a wide variety of the commonly used detectors and its effectiveness varies as the exponent characterizing the law of response is reduced.

An analytical consideration of the problem will show that, even for a single detector, the discrimination against undesired modulation products will be perfect if the detector has a certain law of response. Assume that the detector functions to pass a rectified current $i$ whose relation to the impressed alternating voltage V is given by the equation:

$$i = a + bV + cV^2 \qquad (11)$$

The problem is to determine such values of $b$ and $c$ that the addition to the rejector voltage of an undesired voltage of a different radio frequency will produce no change in the average value $i_{av}$ of the output current. To accomplish this effect, the detector characteristic must be so chosen that the quantity $i_{av}$ is constant with respect to the amplitude of the undesired signal $E_2$ or to the ratio $$\beta_2 = \frac{E_2}{E_1}$$

From Equation (1) it follows that:

$$\frac{V}{E_1} = \sqrt{1 + \beta_2^2 + 2\beta_2 \cos x}$$

Considering the radio input voltage impressed on the detector and the detector output voltage $e = iR$ in terms of the peak rejector voltage $E_1$, the equation of the assumed detector characteristic $i = f(V)$ may be written as:

$$\frac{e}{E_1} = a + b\left(\frac{V}{E_1}\right) + c\left(\frac{V}{E_1}\right)^2 \qquad (12)$$

The average value of $$\frac{e}{E_1}$$

over a cycle of variation of the undesired signal amplitude $\beta_2$ may be written:

$$\text{Average}\frac{e}{E_1} = \frac{e_{av}}{E_1} = a + \frac{b}{\pi}\int_0^\pi \sqrt{1 + \beta_2^2 + 2\beta_2 \cos x}\,dx +$$

$$\frac{c}{\pi}\int_0^\pi (1 + \beta_2^2 + 2\beta_2 \cos x)\,dx \qquad (13)$$

The second term of this equation is very closely equal to:

$$b\left[1 + \left(\frac{4}{\pi} - 1\right)\beta_2^2\right]$$

and the third term, after integrating and supplying the limits yields:

$$c(1 + \beta_2^2)$$

It is evident that, if the arbitary constants of Equation (12) are so chosen as to make $$c = -b\left(\frac{4}{\pi} - 1\right),$$

the resulting expression for the average $$\frac{e}{E_1}$$

will be independent of $\beta_2$.

This condition is satisfied when Equation (12) is rewritten as:

$$\frac{e}{E_1} = a + b\left(\frac{V}{E_1}\right) - 0.272b\left(\frac{V}{E_1}\right)^2 \qquad (14)$$

In Fig. 10, the curve D is a graph of the detector characteristic, Equation (14), for the special case in which $a = 0$, and $b = 1$. $\beta_2$ may have any value between zero and unity and in Fig. 10 is taken to be 0.5. The lower curve H is the envelope of the total impressed radio voltage $$\frac{V}{E_1}$$

the unmodulated undesired voltage plus the rejector voltage, plotted on a vertical time axis $x$, for the special case of $\beta_2 = 0.5$ which corresponds to an undesired carrier voltage equal to one-half the rejector voltage. The dotted horizontal line J is drawn at a height corresponding to the value of $$\frac{e}{E_1}$$

when $$\frac{V}{E_1}$$

is unity. In other words J represents the ratio of direct current output voltage to peak rejector voltage assuming the detector input to be only the rejector voltage. The curve L represents a half-cycle of the detector output $$\frac{e}{E_1}$$

plotted on a horizontal time axis corresponding to the first half-cycle of the envelope H of the combined radio voltages.

The shape of the detector characteristic $$f\left(\frac{V}{E_1}\right)$$

is such that the cross-hatched area I is equal to the area II for all values of $\beta_2$ between zero and unity as well as for the special case, $\beta_2 = 0.5$, illustrated. Consequently, the average output, $$\frac{e_{av}}{E_1}$$

over a cycle of envelope H corresponds to line J and is unchanged by the presence of the undesired voltage. Thus any amplitude modulation of the undesired voltage will not cause a variation of the average detector output at the modulation frequency. It is seen that the characteristic curve D must be concave downward to product this effect.

Detector systems which may be designed to give a characteristic of this desired shape are illustrated in Figs. 11 and 12, the Fig. 11 circuit employing a single detector, while the Fig. 12 detector system includes a diode or linear detector in combination with a triode or square-law detector.

As shown in Fig. 11, the detector tube 52 is a triode in which the plate P and cathode K operate as a diode in connection with the input impedance 53 and the output resistance 54, the latter being shunted by a radio frequency by-pass condenser 55. These elements alone would give a linear relation between the output voltage $E_a$ and the radio voltage V. The rectifier includes, however, a feed-back circuit to impress a part of the output voltage developed across resistance 54 between the control grid G and the cathode K. This circuit includes a tap 56 on the resistance 54 and a steady biasing potential, such as a battery 57, which places a positive bias on the grid. Rectified current flowing through the resistance tends to bias the grid more negatively as the input potential increases, and this negative bias reduces the rectification between the plate P and cathode K to modify the normally linear detector characteristic to one of approximately the shape shown in Fig. 10. Appropriate values for the constants of this circuit are:

Battery 57 = 4 volts
Resistance 54 = 1 megohm
Condenser 55 = 25 micromicrofarads
Tube 52 = Type 227

In an experimental test with the tap 56 adjusted to make the ratio $$\frac{a}{b}$$

of the sections of resistance 54 equal to 0.2, and a rejector voltage of 35 volts R. M. S., the discrimination against undesired signals was substantially perfect.

In the detector circuit of Fig. 12, the incoming carrier voltage V developed across the input impedance 60 is impressed upon a linear rectifier 61, and a desired fraction of that voltage is impressed, by means of a tapped connection 62, on a square-law rectifier 63. Rectifier 61 is shown as a conventional triode, with plate and grid connected to constitute a typical linear detector. The input connection to this rectifier includes a radio frequency condenser 64, and the output impedance comprises a resistance 65 shunted by a condenser 66 and in series with a radio frequency choke 67. The rectifier 63 is of the conventional plate-circuit rectification type, and the energizing potentials are such that it has a square-law characteristic. The audio output of this rectifier is developed cross the output resistance 68, and the audio frequency output of the combined rectifier is taken off by leads 69, 70 which are connected to the anode terminals of the output resistances 65 and 68, respectively. The output circuit of rectifier 63 includes a plate current source B and is by-passed for radio frequencies by a condenser 71, and the cathode circuit includes a resistor 72, shunted by a condenser 73, for biasing the control grid.

With these connections, the instantaneous polarities of the audio outputs $E_x$, $E_y$, respectively, of the two rectifiers are, for an increase in the radio voltage V, as shown by the plus and minus signs adjacent the terminals of the output resistances. The square-law response component is thereby subtracted from the linear response component and, by appropriate adjustment of the tap 62, these components may be so related that the characteristic of the system closely approximates the curve D of Fig. 10. Typical values for the circuit constants for broadcast frequencies are:

Condensers 64, 66 = 25 micromicrofarads
Condenser       71 = 0.001 microfarads
Condenser       73 = 1 microfarad
Resistance      65 = 100,000 ohms
Resistance      68 = 50,000 ohms
Resistance      72 = 10,000 ohms
Battery B          = 180 volts
Tubes 61, 63     = Type 227

A rectifier combination operating on a different principle is shown schematically in Fig. 13 as comprising two independent, parallel channels I, II which each include a radio frequency amplifier 75 and a square-law detector 76, while only the channel II includes or has connected thereto an oscillator 77. Both the undesired modulated voltage $E_2$ and the desired modulated voltage $E_3$ are transmitted by the parallel channels, the modulation frequency outputs of the two channels are impressed, through the similar but reversely connected transformers 78, between the audio frequency output terminals A, F. Throughout the range of response over which the square-law rectifiers 76 are similar the discrimination against modulation frequencies of the undesired carrier is very great. At the same time the output voltage between A and F due to the modulation of a desired carrier voltage will bear a linear relation to the amplitude of modulation on the desired carrier.

It is obvious that the various circuit arrangements described with reference to the figures may be used in other combinations than those shown. For instance, the method described in connection with Fig. 9 may be used in conjunction with the improvements in discrimination factor referred to in the description of Figs. 10, 11, 12, and 13. The invention is not to be limited to a particular method of obtaining the rejector oscillation, to a particular type of oscillating circuit, nor to the methods of injecting the rejector voltage into the detector.

I claim:

1. In the reception of radio frequency waves, the method of discriminating against an undesired radio frequency wave of a frequency adjacent to but differing from that of a desired wave, which comprises increasing the amplitude of the desired wave without substantial increase in the amplitude of the undesired wave by combining therewith an unmodulated rejector voltage of the frequency of the desired wave, and detecting with substantially equal efficiencies the amplitude modulation on the desired wave of increased amplitude and the amplitude modulation on the wave resulting from the combination of the rejector voltage and the carrier component of the undesired wave.

2. In the reception of modulated radio frequency waves, the process of selective detection to discriminate against modulation frequency output due to an undesired wave of a frequency differing from that of a desired wave, which process comprises combining received desired and undesired waves with an unmodulated rejector voltage of a frequency and phase which increases the amplitude of the carrier of the desired wave with respect to the amplitude of its side bands and by a greater amount than any corresponding increase in the amplitude of the carrier of the undesired wave with respect to the amplitude of its side bands, and selectively demodulating with unequal efficiencies the signal modulation on the wave form obtained by combining the desired wave with the rejector voltage and the signal modulation on the wave form obtained by combining the undesired wave with the rejector voltage.

3. In the reception of radio frequency waves by the process of combining received waves, of a desired frequency and of a frequency differing therefrom, with a locally produced rejector oscillation of the frequency of the desired wave, the method which comprises maintaining the rejector voltage substantially in phase with that of the desired wave, and detecting with substantially unequal efficiencies the signal modulation components on the respective waves resulting from the combination of the rejector voltage with the desired and the undesired frequency waves.

4. In the reception of modulated radio frequency waves with a detector whose rectified current output varies no more rapidly than in proportion to the average of the peak values of the total voltage impressed thereon, the process which comprises amplifying received radio frequency waves substantially increasing the value of the carrier amplitude with respect to the side band amplitude of only the desired one of the received radio frequency waves, and detecting with substantially equal efficiencies the amplitude modulation on the desired wave of increased carrier amplitude and the amplitude modulation on the wave resulting from the combination of the rejector voltage with the carrier component of an undesired wave.

5. The invention as set forth in claim 4, wherein said increase of the value of the carrier amplitude is effected by combining with the desired wave an unmodulated radio frequency voltage of the frequency of the desired wave.

6. In the reception of modulated radio frequency waves with a receiver comprising a tuned radio frequency amplifier, means for locally-producing an unmodulated oscillating voltage of radio frequency, and a detector, the process of discriminating against undesired signals of a carrier frequency differing from that of a desired signal, which process comprises tuning said receiver to effect a maximum amplification of the carrier frequency of the desired signals, adjusting said means to produce an oscillating voltage of the same frequency constantly in phase with said desired frequency, and impressing both the oscillating voltage and the amplified signals upon the detector, and detecting with substantially equal efficiencies the amplitude modulation on the desired carrier frequency and the beat frequency resulting from the combination of the undesired carrier frequency and the locally-produced oscillating voltage.

7. In a radio receiving system, the combination with a carrier frequency amplifier, and means for producing locally an oscillating voltage of the carrier frequency of a desired transmission channel, of rectifier means including means for imparting the characteristics of passing an average output current which varies with but no more rapidly than in proportion to the average value of the total peak voltage impressed thereon and of detecting with substantially equal efficiencies voltage variations within a range including amplitude modulation on a desired carrier frequency and a frequency equal to the frequency difference between adjacent carrier frequency channels.

8. In a radio receiver, the combination with means for receiving incoming radio frequency signalling waves falling within a band of frequencies, a rectifier having the property of detecting with substantially equal efficiencies the audio frequency voltages corresponding to modulation on a desired carrier frequency and the beat frequencies resulting from the heterodyning of an undesired carrier frequency with a closely adjacent carrier frequency voltage, and means for locally producing and combining with received waves an oscillating voltage of the frequency of a desired wave, of means for maintaining a substantially constant phase relationship between the produced oscillating voltage and that of an incoming desired signalling wave.

9. The invention as set forth in claim 8, wherein said means for producing an oscillating voltage comprises a vacuum tube and circuit element connected thereto to constitute an oscillator.

10. In a radio receiver adapted for the selective rectification of a modulated wave, an amplifier stage having a tuned output circuit, an oscillator whose frequency is synchronized with and bears a constant phase relation to the carrier frequency of the modulated wave said oscillator having said tuned output circuit as the frequency determining impedance thereof, a detector connected in parallel across said output circuit and said oscillator and means automatically suppressing variations in oscillator output voltage as said output circuit is tuned over a frequency band.

11. In a radio receiver adapted for the selective rectification of a modulated wave, an amplifier stage having a tuned output circuit, an oscillator whose frequency is synchronized with and bears a constant phase relation to the carrier frequency of the modulated wave said oscillator having said tuned output circuit as the frequency determining impedance thereof, a detector connected in parallel across said output circuit and said oscillator and means rendering the oscillator inoperative when the magnitude of a desired signal falls below a predetermined value.

12. In a radio receiver for the selective detection of signalling waves of a desired radio frequency, the combination with a carrier frequency amplifier, and means for producing locally an oscillating voltage, of a detector stage comprising the combination of a vacuum tube, an input circuit therefor, an output impedance, the output impedance comprising a parallel mesh having a resistance branch and a capacity branch, the value of the capacity branch being of such magnitude that the impedance of the parallel mesh is not substantially less than the resistance of the resistance branch for the maximum difference in carrier frequency over which selective detection is desired, a load circuit upon which the rectified voltage is impressed, and means automatically reducing the rate at which increasing radio frequency voltage develops increased rectified voltage in said load circuit.

13. The invention as set forth in claim 12, wherein said load circuit is connected across said output impedance, and said last means includes a circuit connection between said output impedance and an element of said tube, whereby current flow in said output impedance automatically biases said tube to reduce the rectification efficiency thereof.

14. The invention as set forth in claim 12, wherein said last means comprises a second and square law detector, an input circuit for impressing on said second detector a portion of the radio frequency voltage impressed on said first detector, and an output impedance for said second detector, said load circuit being connected to said respective output impedances to combine the rectified voltages thereof in opposing relation.

15. In a radio receiver, a tuned amplifier for the selective transmission of signals of a desired carrier and an undesired carrier frequency, and a local oscillator tuned to the desired carrier frequency, of means demodulating with equal efficiencies the wave form resulting from the combination of the local oscillations with the desired carrier and the amplitude modulation on the wave form resulting from the combination of the local oscillations with the carrier frequency component of an undesired carrier, and means for impressing upon the said demodulating means the outputs of said tuned amplifier and said oscillator.

16. In radio receiving apparatus, a radio amplifier, means for producing locally a rejector voltage of the frequency of a desired carrier, a detector having a low output impedance for the desired carrier frequency and a high output impedance for beat frequencies produced by the combination of the said rejector voltage and a non-desired carrier frequency, said detector being of the type having a rectified output which varies with but at a less rapid rate than variations in the radio voltage impressed thereon, said detector including an input circuit and an output circuit, the output circuit comprising a parallel mesh having a resistance branch and a capacity branch, the value of the capacity branch being of such magnitude that the impedance of the parallel mesh is not substantially less than the resistance of the resistance branch for the maximum difference in carrier frequency over which selective detection is desired.

17. In a radio receiver, the combination with means for receiving incoming radio frequency signalling waves falling within a band of frequencies, a rectifier and means for locally producing and combining with received waves an oscillating voltage of the frequency of the desired signalling wave, of means for rendering said last means inoperative when the magnitude of the desired signalling wave falls below a predetermined critical value.

18. A radio receiver as claimed in claim 17 wherein said means for receiving incoming radio frequency signalling waves includes a circuit tunable over the said band of frequencies, and said means for locally producing oscillations comprises a vacuum tube oscillator having the said tunable circuit as the frequency-determining circuit thereof.

19. The method of receiving radio signals which includes the steps of combining with the received signal energy of a desired frequency a locally produced oscillatory voltage of the same frequency as the said desired frequency, automatically controlling the output of the local oscillator as a function of the magnitude of the received signal energy of the desired frequency and substantially suppressing the output of the local oscillator when the received signal energy of the desired frequency falls below a predetermined critical value.

20. In the reception of radio frequency signalling waves, the method of discriminating against an undesired radio frequency wave of a frequency adjacent to but different from that of a desired wave, which method includes the steps of increasing the amplitude of the desired wave without substantial increase in the amplitude of the undesired wave by combining both the received desired wave and the received undesired wave with an unmodulated rejector wave of the frequency of the desired wave but of greater amplitude than the desired wave, automatically controlling the rejector wave as a function of the magnitude of the received desired wave and detecting the amplitude modulation on the desired wave of increased amplitude and the amplitude modulation on the wave resulting from the combination of the rejector wave and the carrier component of the undesired wave.

PAUL O. FARNHAM.